United States Patent
Ludois et al.

(10) Patent No.: US 8,736,137 B2
(45) Date of Patent: May 27, 2014

(54) WOUND FIELD ROTATING MACHINE WITH CAPACITIVE POWER TRANSFER

(75) Inventors: Daniel Colin Ludois, Madison, WI (US); Justin Kyle Reed, Madison, WI (US); Kyle Hanson, Livonia, MI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 333 days.

(21) Appl. No.: 13/210,928

(22) Filed: Aug. 16, 2011

(65) Prior Publication Data

US 2013/0043762 A1    Feb. 21, 2013

(51) Int. Cl.
*H02K 13/00* (2006.01)

(52) U.S. Cl.
USPC .......................................... 310/219; 310/68 D

(58) Field of Classification Search
USPC ................................. 310/68 D, 219
See application file for complete search history.

(56) References Cited

U.S. PATENT DOCUMENTS

| | | | |
|---|---|---|---|
| 2,710,371 A | | 6/1955 | Baensch |
| 2,722,652 A | | 11/1955 | Brainard |
| 3,573,520 A | * | 4/1971 | Dorshimer .................... 310/168 |
| 3,577,049 A | * | 5/1971 | Madurski et al. ........... 318/400.4 |
| 3,662,240 A | * | 5/1972 | Yukisada et al. .............. 388/816 |
| 3,686,523 A | * | 8/1972 | Gorden et al. ................... 310/72 |
| 5,668,458 A | * | 9/1997 | Ueda et al. ..................... 318/716 |
| 6,034,492 A | * | 3/2000 | Saito et al. ..................... 318/141 |
| 6,141,217 A | * | 10/2000 | Nakahama et al. ........... 361/694 |
| 7,459,823 B1 | | 12/2008 | Kerlin |

FOREIGN PATENT DOCUMENTS

| GB | 1437785 | 3/1966 |
|---|---|---|
| GB | 1021669 | 6/1976 |

OTHER PUBLICATIONS

Liu, C., et al., Steady State Analysis of a Capacitively Coupled Contactless Power Transfer System, Energy Conversion Congress and Exposition, 2009. ECCE 2009, pp. 3233-3238. IEEE, Piscataway, NJ, USA.
Liu, C., Power Flow Control of a Capacitively Coupled Contactless Power Transfer System, Industrial Electronics, 2009. IECON '09. 35th Annual Conference of IEEE, Nov. 3-5, 2009, pp. 743-747, IEEE, Piscataway, NJ, USA.
Liu, C., et al., Coupling Study of a Rotary Capacitive Power Transfer System, ICIT '09 Proceedings of the 2009 IEEE International Conference on Industrial Technology, IEEE Computer Society Washington, DC, USA.

* cited by examiner

*Primary Examiner* — Tran Nguyen
(74) *Attorney, Agent, or Firm* — Boyle Fredrickson, S.C.

(57) ABSTRACT

An electrical rotating machine, such as a generator or motor, communicates power from a stationary location to the rotating rotor of the rotating machine via opposed pairs of capacitor plates, one plate of each pair rotating with the rotor and one plate of each pair fixed not to rotate. In one embodiment, separation between the plates of the pair is provided by a cushion of entrapped air.

18 Claims, 9 Drawing Sheets

WOUND FIELD ROTATING MACHINE WITH CAPACITIVE POWER TRANSFER

BACKGROUND OF THE INVENTION

The present invention relates to wound field synchronous machines (e.g. electrical motors and generators) and in particular to a wound field synchronous machine using capacitive coupling to transfer electrical power to the rotor.

Electrical motors and generators share similar structures of a magnetically interacting stator and rotor and may be collectively termed "electrical rotating machines." Electrical rotating machines employing permanent magnets for the rotor are termed permanent magnet synchronous machines (PMSM) and are popular in high-volume traction applications (e.g. motor drives for hybrid vehicles) and for compact electrical generation (e.g. generators used in wind turbines) because of their high torque density and efficiency.

The permanent magnets in PMSMs typically use rare earth materials of limited supply whose extraction and refinement may inflict detrimental effects on the environment. For this reason, wound field synchronous machines (WFSM), using an electrical coil in place of the permanent magnet on the rotor, have received renewed attention. WFSMs have lower torque density in comparison to PMSMs but, by permitting control of the rotor field directly, allow more sophisticated motor control, for example, permitting high power factor throughout the machine operating range of different operating speeds and torques. The ability to control the rotor field also permits improved handling of faults by allowing back EMF to be controlled (by removing the field current).

A significant disadvantage to WFSMs is difficulty of coupling significant electrical power to a rotating rotor coil. Such coupling may be done by using electrical "slip rings" in which brushes, typically a carbon composite material, mechanically slide on continuous or semi-continuous metal rings. This mechanical approach is subject to problems of wear on the brushes and rings and the problem of generating debris from such, which may contaminate the environment of the motor.

An alternative approach to mechanical electrical coupling is the transfer of electrical energy by mutual inductance between coils of a rotary transformer. In such a transformer, a stationary primary coil may communicate, via magnetic fields, with a secondary coil mounted to rotate with the rotor. The conductive coils of a rotary transformer and the ferromagnetic components normally used to concentrate the magnetic flux may substantially increase the weight and cost of the motor.

Capacitive coupling is known for low-power electrical data transfer, for example, for transferring digital data from a rotating device. The use of capacitive coupling in motor applications, for example, by using adjacent rotating and stationary capacitor plates, is hampered by relatively small capacitance that can be obtained with practical tolerances and the need for significantly greater amounts of power for practical motor operation.

SUMMARY OF THE INVENTION

The present invention provides a wound-field synchronous machine in which power is transferred to the rotor via capacitive coupling. In one embodiment, capacitive coupling is obtained between a rotating and stationary capacitor plate by allowing one plate to float on a cushion of flowing air, generated by the relative motion of the plates, in the manner of an air bearing. Small changes in plate separation incident to the floating plate configuration may provide a measurement of the velocity of the rotor and inclusion of a capacitance-altering feature on one of the plates may also provide information about the rotor position.

Specifically, the present invention provides a wound field electrical rotating machine having a rotor mounted for rotation about an axis and including at least one electrical coil having a coil axis with a component perpendicular to the axis, the electrical coil comprising a conductor having first and second conductor ends. An electrical rectifier unit is attached to the rotor, to rotate therewith, and electrically connected with the first and second conductor ends, and a first and second capacitor plate attached to rotate with the rotor and electrically connected with the electrical rectifier unit. A third and fourth capacitor plate are mounted to a frame so as not to rotate with the rotor and positioned for capacitive coupling with a respective first and second capacitor plate wherein the first, second, third, and fourth capacitor plates may transfer power between the electrical coil and the third and fourth capacitor plate at a range of angular positions of the rotor about the axis.

It is thus a feature of at least one embodiment of the invention to provide a power coupling system for field-wound electrical rotating machines that avoids the mechanical wear problems of slip rings and brushes without the cost expense and weight of rotary transformers.

The first and second capacitor plates may be separate plates attached to a rotor axle to extend in planes normal to the axis separated along the axis and wherein the third and fourth capacitor plates are interleaved between the first and second capacitor plate.

It is thus a feature of at least one embodiment of the invention to provide an arbitrary capacitor area for a given plate spacing tolerance by an interleaving configuration.

The wound field electrical rotating machine may further include a power generation circuit substantially fixed with respect to the frame, so as not to rotate with the rotor, and connected with the third and fourth capacitor plates to provide alternating current power to at least one electrical coil having a frequency in excess of 50 kHz.

It is thus a feature of at least one embodiment of the invention to permit limited area capacitors to provide sufficient power for motor operations by employing high-frequency currents at which such capacitors have lower impedance.

The power generation circuit provides at least one watt of electrical power to the electrical coil.

It is thus a feature of at least one embodiment of the invention to provide practically useful motor or generator applications using capacitive coupling.

The power generation circuit may provide for regulation of output current to the third and fourth capacitor plates to a predetermined value.

It is thus a feature of at least one embodiment of the invention to provide a power generation system that may accommodate minor variations in capacitance of the couplers with reduced power fluctuation. As the capacitance drops, the frequency provided by the power generation system may increase to compensate.

The wound field electrical rotating machine further includes an inductance in series with at least one of the third and fourth capacitor plates, where the power generation circuit tracks a resonant frequency of a series resonant circuit including at least the inductance and a series combination of a capacitance formed between the first and third capacitive plate and second and fourth capacitive plate, and wherein the power generation circuit adjusts the alternating current signal to match a frequency of the resonant frequency.

It is thus a feature of at least one embodiment of the invention to provide a power generation circuit which may operate in a narrow low impedance frequency range and accommodate slight shifts in that frequency range with mechanical or electrical changes in the coupling circuit.

The power generation circuit may adjust the alternating current signal to match a frequency of the resonant frequency by tracking zero crossings of the alternating current signal and changing a voltage polarity of the alternating current signal at the zero crossings.

It is thus a feature of at least one embodiment of the invention to employ well understood "soft switching" techniques to provide desired frequency tracking and/or high efficiency.

At least one given pair of the first and third capacitive plates and second and fourth capacitive plates, a given plate of the given pair may be movably mounted to change a spacing with the other plate of given pair so that the given plate may float on air cushion adjacent to the other plate.

It is thus a feature of at least one embodiment of the invention to provide narrower separation between the capacitor plates and hence higher capacitance values than might be ordinarily obtained with fixed mechanical tolerances.

A dielectric material may be affixed to one of the given plate or the other plate of the given pair.

It is thus a feature of at least one embodiment of the invention to increase the capacitance between the plates and prevent shorting between the plates at zero motor velocity.

The wound field electrical rotating machine may further include a spring biasing the given plate toward the other plate of the given pair.

It is thus a feature of at least one embodiment of the invention to control the stiffness of the separation of the plates against the air cushion for improved capacitance and stability.

The first, second, third, and fourth capacitive plates may have pair wise configurations selected from the groups consisting of parallel planar plates and concentric cylindrical plates.

It is thus a feature of at least one embodiment of the invention to provide a coupling system that may be flexibly implemented in a variety of topologies.

The first and second capacitive plates and third and fourth capacitive plates may be different ones of an air bearing journal and air bearing shaft.

It is thus a feature of at least one embodiment of the invention to provide capacitive coupling in an air bearing structure.

The wound field electrical rotating machine may further include a capacitance monitor measuring a capacitance between at least one pair of capacitive plates to provide an output signal indicating velocity of the rotor.

It is thus a feature of at least one embodiment of the invention to provide a simplified method of determining motor velocity without a separate velocity sensor.

The wound field electrical rotating machine may further include field current control changing an electrical signal providing a magnetic field in the wound field electrical rotating machine as a function of the output signal indicating velocity of the rotor.

It is thus a feature of at least one embodiment of the invention to provide velocity-based control of the motor using a capacitance-derived velocity.

The wound field electrical rotating machine may alternatively or in addition use the capacitance monitor to provide an output signal indicating a position of the rotor.

It is thus a feature of at least one embodiment of the invention to provide a simplified method of determining rotor position.

The wound field electrical rotating machine may further include a field current control changing an electrical signal providing a magnetic field in the wound field electrical rotating machine as a function of the output signal indicating position of the rotor.

It is thus an object of at least one embodiment of the invention to provide motor control based on capacitance-derived position.

These particular features and advantages may apply to only some embodiments falling within the claims and thus do not define the scope of the invention.

DETAILED DESCRIPTION OF THE PREFERRED EMBODIMENT

Figure 1:
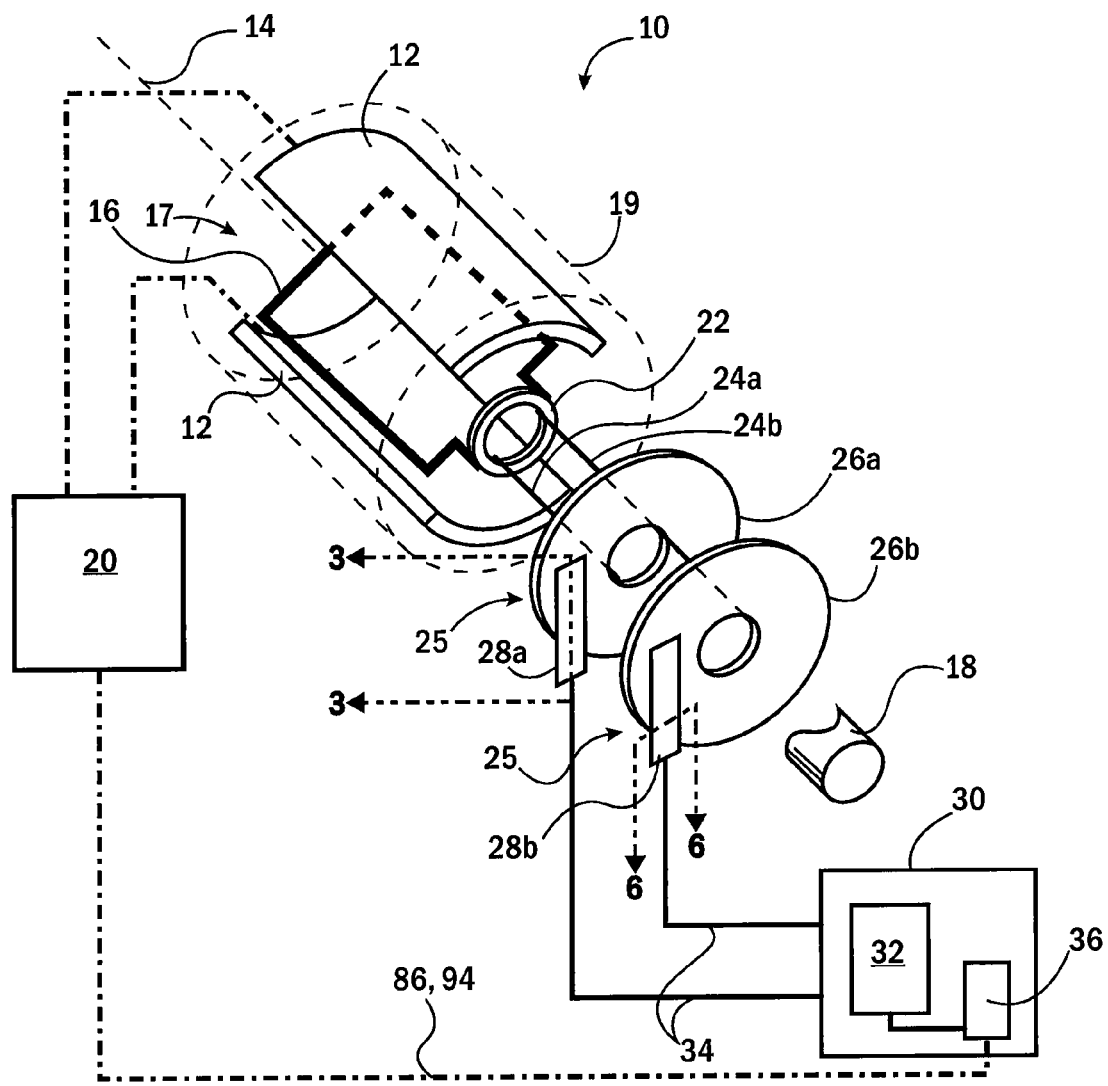
FIG. 1 is a simplified representation of the wound-field electrical motor according to the present invention providing a wound field rotor coil attached via two capacitive coupling units with drive electronics for providing high-frequency AC power through the capacitive coupling units to the coil of the rotor.

Referring now to FIG. 1, a wound field synchronous machine 10 configured as a motor may include stationary stator windings 12 opposed across a motor axis 14 and generating a magnetic field crossing the motor axis 14.

A rotor 17 is positioned between the stator windings 12, may provide rotor coil 16 (only the rotor coil 16 shown for clarity) wound about an axis generally perpendicular to the axis 14. For clarity, only a single loop of the rotor coil 16 is shown however it will be understood that typically the rotor coil will comprise many turns of a conductor such as copper wire formed in one or more loops. Generally the rotor coil 16 will be supported on additional structure of the rotor 17 which may be either non-ferromagnetic or ferromagnetic to concentrate the magnetic flux generated by the rotor coil 16.

The rotor 17 may turn about the axis 14 as attached to a shaft 18, the latter supported for rotation about axis 14 on bearings (not shown), the latter held in a motor housing 19. Electric current through the rotor coil 16 will generate a magnetic field according to principles well known in the art, the magnetic field directed generally perpendicularly to the motor axis 14 and rotating with rotation of the rotor coil 16.

As is generally understood in the art, the stator windings 12 may be energized by a stator winding control unit 20 which controllably switches the direction of the field extending between stator windings 12 to promote an angular torque on the rotor coil 16 causing rotation of the rotor 17 and the shaft 18. The switching of current through the stator windings 12 to this torque may be done "open loop" without knowledge of the state of the rotor 17, or by means of position or velocity feedback in which the state of the rotor 17 is monitored as a feedback signal using a position or velocity sensor of conventional design (not shown) or a position sensing technique of the present invention to be described below.

The conductors of the rotor coil 16 may attach to a rectifier assembly 22 which provides a direct current to the rotor coil 16 from AC current lines 24a and 24b providing inputs to the rectifier assembly 22. The rectifier assembly 22 may be, for example, a full-wave rectifier employing solid-state diodes of conventional design and may be mounted to rotate with the rotor coil 16 on the shaft 18.

Each of AC current lines 24a and 24b may in turn connect to one of two capacitive coupling units 25. The capacitive coupling units 25 each have a capacitive plate pair including a rotating plate 26 and the stationary plate 28. In this embodiment, two rotating plates 26a and 26b are used, one for each capacitive coupling unit 25, and comprise a conductive disk mounted at its center on the shaft 18 to extend perpendicularly therefrom so that it may rotate about the axis 14 with the rotor 17 in a plane perpendicular to the axis 14. The rotating plates 26a and 26b are individually attached to different ones of the AC current line 24a and 24b.

The non-rotating plates 28a and 28b of each capacitive coupling unit 25 may be, in this embodiment, flexible conductive strips having a cantilevered plate portion 61 extending over a broad surface of respective rotating plates 26a and 26b along a tangent to the axis 14. The non-rotating plates 28a and 28b are closely spaced to the respective rotating plates 26a and 26b across a narrow gap to provide an electrical capacitance therebetween.

The non-rotating plates 28 are attached in turn to drive electronics 30 providing AC power to the non-rotating plates 28 which may then be capacitively coupled to the rotating plates 26a and 26b, rectified by the rectifier assembly 22, and provided as a DC current to the rotor coil 16. Generally, as will be described in more detail below, the drive electronics 30 may include a solid-state frequency synthesizer 32 for generating the AC signals 34 from a DC source at a controllable frequency. The drive electronics 30 may be associated with monitoring circuitry 36 which may monitor the drive electronics 30 and/or the AC signal 34 to deduce motor parameters such as velocity and rotor position, as will be described below.

Figure 2:
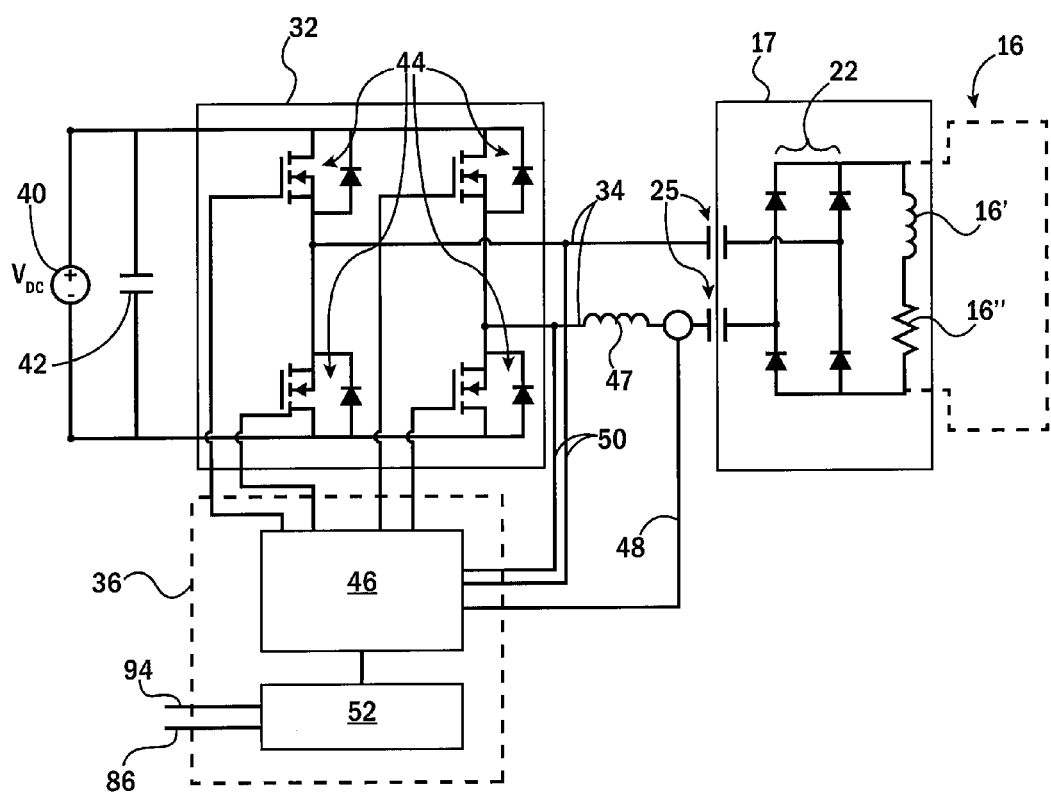
FIG. 2 is a schematic block diagram of the motor and drive electronics of FIG. 1, the drive electronics including a switching circuit and switch signal generator connected to a capacitance monitor for providing position and velocity signals.

Referring now to FIG. 2, the frequency synthesizer 32 may comprise a standard H-bridge array of transistors 44 receiving a source of DC power 40 filtered by filter capacitor 42 and operating to switch the polarity of application of the DC power to an output providing the AC signals 34. Other synthesizing circuits known in the art may also be used including half bridges, push-pull stages, etc. In one embodiment, as will be described in more detail below, the switching transistors 44 are operated in a pulse width modulated fashion (with the transistors on or off) to produce a pulsed voltage output of variable duty cycle, typically at a frequency in excess of 50 kHz or preferably in excess of 100 kHz and possibly in the megahertz range. Standard antiparallel diodes are provided for each transistor 44. It will be understood that the shown MOSFET transistors may be replaced with other solid state devices such as IGBTs and the like.

The gates of the switching transistors 44 are controlled by a switch logic circuit 46 as will be discussed below which may optionally receive a current signal 48 monitoring the current of the AC signals 34 and a voltage signal 50 monitoring the voltage of the AC signal 34. It will be understood the current sensing and voltage monitoring could be performed at a variety of other locations. For example, the current sensing could occur at the DC bus (in series with one of the lines spanned by capacitor 42) and the voltage sensing may not be required in certain circumstances or may be inferred from knowledge of the voltage of the DC bus and the switching pattern of the transistors 44.

Referring still to FIG. 2, electrical power from the AC signal 34 will be transferred through the capacitive coupling units 25 to the rotor 17 to be received by the rectifier assembly 22 and from the rectifier assembly 22 to the rotor coil 16 electrically represented by a coil inductance 16' and coil resistance 16". The rectifier assembly 22 may consist of four solid-state semiconductor diodes arranged in a full wave rectifier configuration as is generally understood in the art to convert the high frequency AC signal 34 to a DC voltage applied across the rotor coil 16. It will be appreciated that other rectifier configurations may also be used including a halfway rectifier voltage doubler, current doubler or voltage multiplier (Cockroft-Walton circuit).

In one embodiment, an inductor 47 may be placed in series with the capacitive coupling units 25 between the frequency synthesizer 32 through one capacitive coupling unit 25 through the rotor coil 16 and back through the other capacitive coupling unit 25. This inductor 47, in series with the series capacitances of the capacitive coupling units 25 (formed by the capacitance between non-rotating plates 28 and respective rotating plates 26) and possible residual impedance of the rotor coil 16, presents a series resonance at which the impedance to current flow through the rotor coil 16 is minimized. The frequency of the frequency synthesizer 32 is accordingly set to this series resonance frequency in order to maximize energy transfer to the rotor coil 16 from the low output impedance frequency synthesizer 32.

In setting the frequency of the AC signal 34 to the series resonant frequency, the switch logic circuit 46 may vary the output frequency of the frequency synthesizer 32 to compensate for slight changes in the series resonant frequency, for example because of changes in the capacitance of the capacitive coupling units 25 with motor speed (as will be discussed below) and/or changes in other elements with temperature or time or as a function of manufacturing tolerance. This tracking may be done in a variety of ways, for example by tracking changes in the phase of the current with respect to the voltage of the AC signal 34 derived voltage signal 50 and current signal 48. In one embodiment, however, this tracking is provided automatically by precise "soft switching" of the transistors 44 at zero current points in the waveform of the AC signal 34 such as will tend to drive frequency of the frequency synthesizer 32 according to the natural resonance of inductor 47 and rotor 17. The switch logic circuit 46 may also control the duty cycle of the AC signal 34 to provide a substantial constant current flow to the stator coil 16 related to a desired control point.

Figure 3:
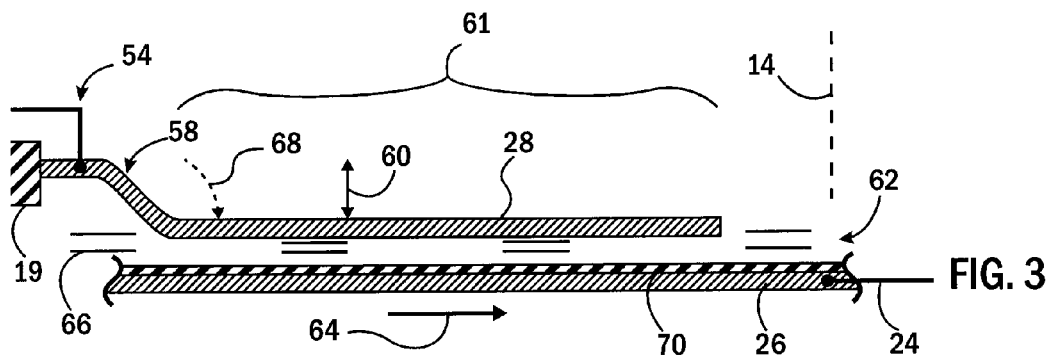
FIG. 3 is a cross-section of one capacitive coupling unit of FIG. 1 taken along line 3-3 of FIG. 1 showing relative axial movement and spring biasing of one plate supported with a first gap on a cushion of air generated by the other plate and showing a dielectric layer attached to the movable plate.

Referring now to FIG. 3, in one embodiment, the non-rotating plates 28 are attached to the housing 19 at proximal end 54 but include a flexing portion 58 or a hinge or other pivot point types known in the art allowing axial motion 60 (generally along axis 14) of a distal plate portion 61. This distal plate portion 61 will be generally parallel to a corresponding surface of the rotating plates 26a and 26b spaced from that surface along axis 14 by a gap 62 which defines the capacitor plate separation. Movement of the distal plate portion 61 thus may change the gap 62.

Rotary motion 64 of a rotating plate 26 beneath the non-rotating plate 28 draws air 66 into the gap 62 compressing that air to provide an air bearing between the rotating plates 26a and 26b and non-rotating plate 28. In this way, the non-rotating plate 28 may float on a thin film of air against a bias force 68 applied to the non-rotating plate 28, for example, by the natural elasticity of the strip of the non-rotating plate 28 or by a separate spring or the like. The bias force 68 may be adjusted to control the stiffness of the positioning of the non-rotating plate 28 for the purpose of stability and the like as well as to control the absolute separation.

An upper surface of the rotating plate 26 opposite the non-rotating plates 28 may be coated with a dielectric layer 70 such as Teflon® or other material that may provide for insulation between the non-rotating plate 28 and the rotating plates 26a and 26b when the non-rotating plate 28 is no longer supported by the layer of air 66, for example, as shown in FIG. 3. Ideally, the dielectric layer 70 will have a breakdown voltage sufficient to prevent electrical direct current flow between plate 28 and rotating plates 26a and 26b when there is zero air gap 62 and will provide some abrasion resistance. The dielectric layer 70 also increases the capacitance for a given gap 62.

In some embodiments, a zero air gap is also permissible at zero rotor speed, even without a dielectric layer. In this case variable frequency ac or even dc may be supplied, which is then directly conducted onto the rotor.

Figure 4:
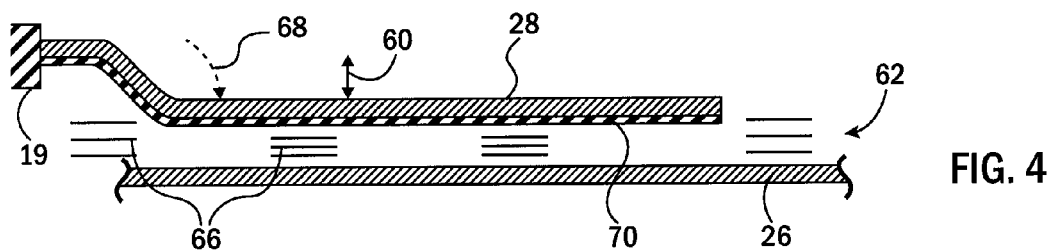
FIG. 4 is a figure similar to that of FIG. 3 in which a dielectric layer is placed on the axially movable plate and showing a second gap larger than the first gap caused by greater relative velocity between the plates.
Figure 5:
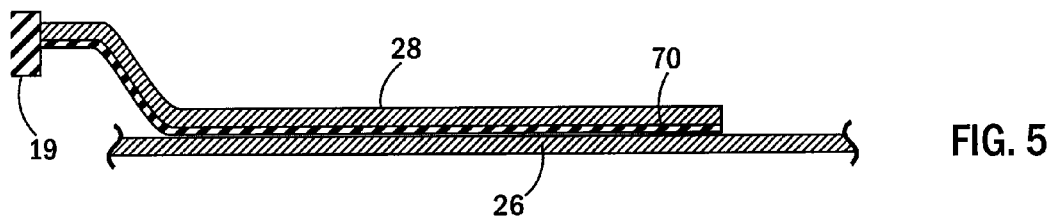
FIG. 5 is a figure similar to that of FIGS. 3 and 4 showing contact of the plates at start up of the motor before the cushion of air is developed, at which time the plates are insulated from each other by the dielectric layer.

Referring now to FIG. 4, in an alternative configuration the dielectric layer 70 may be attached to the under surface of the non-rotating plate 28. This configuration shows a greater separation between non-rotating plate 28 and rotating plates 26 as may occur as the velocity of rotating plates 26 increases.

Figure 6:
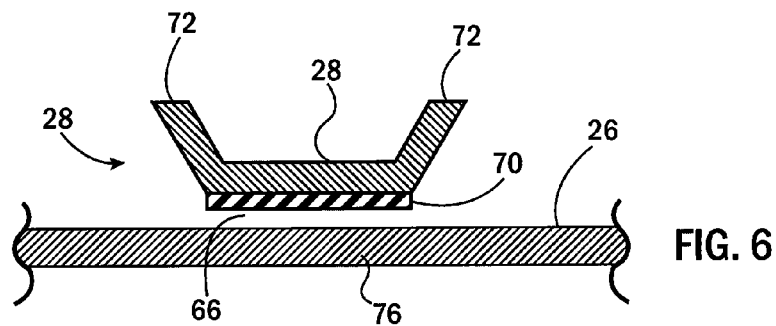
FIG. 6 is a cross-section taken along line 6-6 of FIG. 1 showing side ribs formed in the movable plate to provide for stiffness and light weight.

Referring now to FIG. 6, in one embodiment the non-rotating plate 28 may have ribs 72, for example, formed as wings on either side of the non-rotating plate 28 to provide for greater stiffness and prevent undesirable longitudinal vibrations in the non-rotating plate 28.

Figure 7:
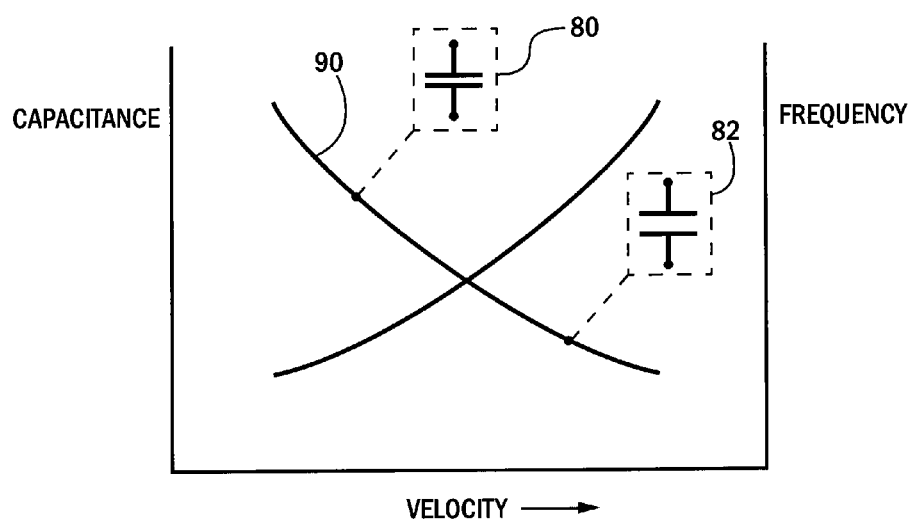
FIG. 7 is a plot of capacitance of the capacitive couplers and frequency of the AC power used for computing motor velocity.

Referring now to FIG. 7, the relationship between the speed of rotating plates 26 and the gap 62 between the rotating plates 26 and non-rotating plate 28 (shown, for example, in FIGS. 3 and 4) affects the capacitance between each non-rotating plate 28 and rotating plates 26 and thus the series resonant frequency of the inductor 47 and capacitive couplings units 25 discussed above. At low velocities, non-rotating plate 28 and rotating plates 26a and 26b are closer together forming a higher capacitance 80 whereas at high velocities, the separation of the rotating plates 26 and non-rotating plates 28 increases forming lower capacitances 82. Per the description of the frequency synthesizer 32 above, higher capacitances 80 will also result in a lower frequency of the AC signal 34 where is lower capacitance 82 will result in a higher frequency of the AC signal 34 allowing capacitance to be deduced from drive frequency. In this way, monitoring the capacitance directly or via the frequency of the AC signal 34, by rotor position and velocity circuit 52, may determine the velocity of the rotor 17. Rotor position and velocity circuit 52 may produce an output signal 86 indicating this velocity.

Figure 8:
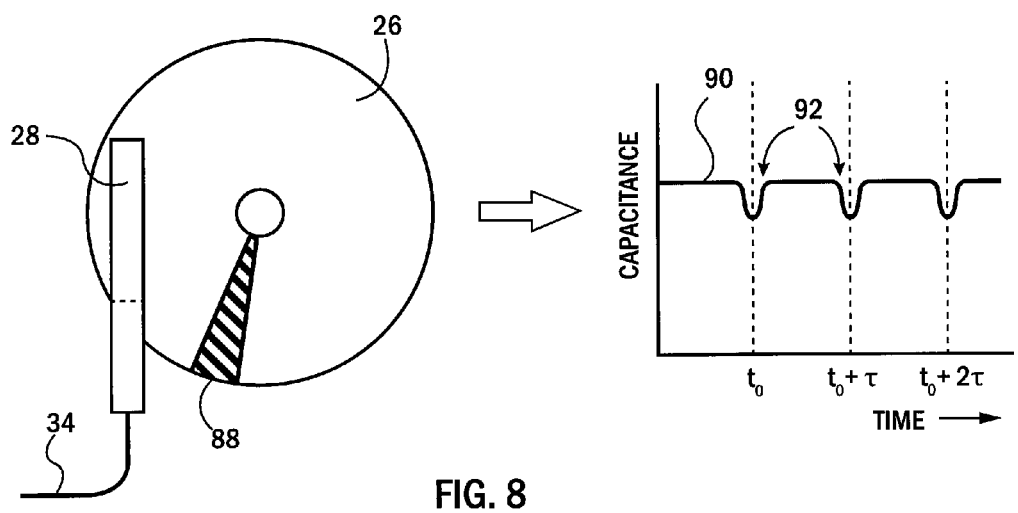
FIG. 8 is a top plan view of one capacitive coupling unit incorporating a capacitance-altering feature to provide a capacitance signal indicating rotor position shown in an associated graph.

Referring now to FIG. 8, optionally, a sector 88 of the surface of the rotating plates 26a and 26b opposite the non-rotating plate 28 may be treated, for example by removal of conductive material in the sector 88 or change in the dielectric material of the sector 88, to produce a perturbations 92 in capacitance value 90 monitored by the rotor position and velocity circuit 52. These perturbations 92 in capacitance value will occur at regular periods τ which will be a function of the rotating speed of the rotor 17. The magnitude of τ may thus be used to reveal the velocity of the rotor 17 but may also reveal absolute position of the rotor 17 at the times of perturbations 92. This position information may be output from rotor position and velocity circuit 52 as output signal 94.

Referring again to FIG. 1, output signal 86 of velocity and output signal 94 of position may be provided to the stator winding control circuit 20 to change the stator field based on speed or position of the rotor 17 according to methods well understood in the art, for example to provide power factor control. Alternatively, or in addition the same signals may be provided to the frequency synthesizer 32 to control the current supplied to the rotor 17 and hence the field of the rotor coil 16. In either of these cases amplitude and/or phase or current may be adjusted as a function of position or velocity.

Figure 9:
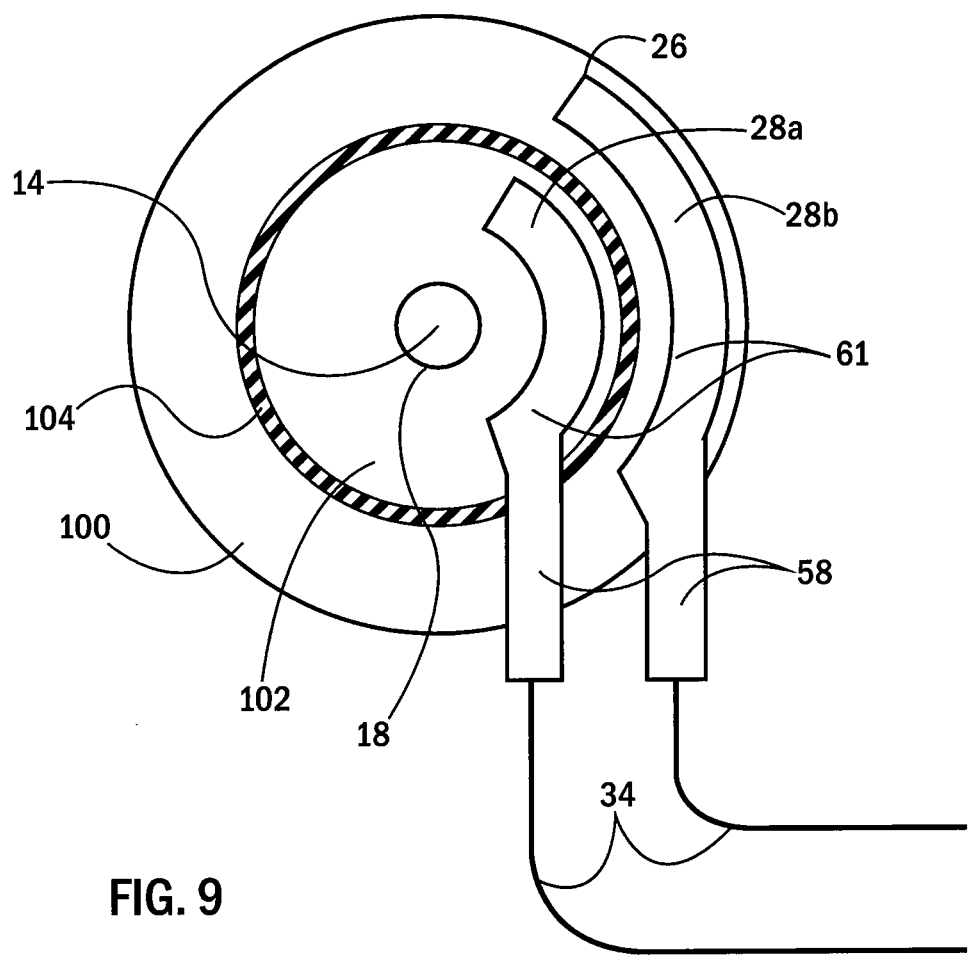
FIG. 9 is an embodiment providing two capacitive coupling units with a single planar disk.

Referring now to FIG. 9, in an alternative embodiment, a single rotating plate 26 may provide the rotating plate 26 two non-rotating plates 28a and 28b of two capacitive coupling units 25. This configuration may allow for more compact construction and employs two electrically isolated conductive rings 100, 102 concentric about the axis 14 for example separated electrically by an insulating portion 104. For example the conductive rings 100, 102 may be conductive layers on an insulating disk-shaped substrate. In addition, annular sector shaped non-rotating plates 28a and 29b allow for increased capacitive coupling area.

Figure 10A:
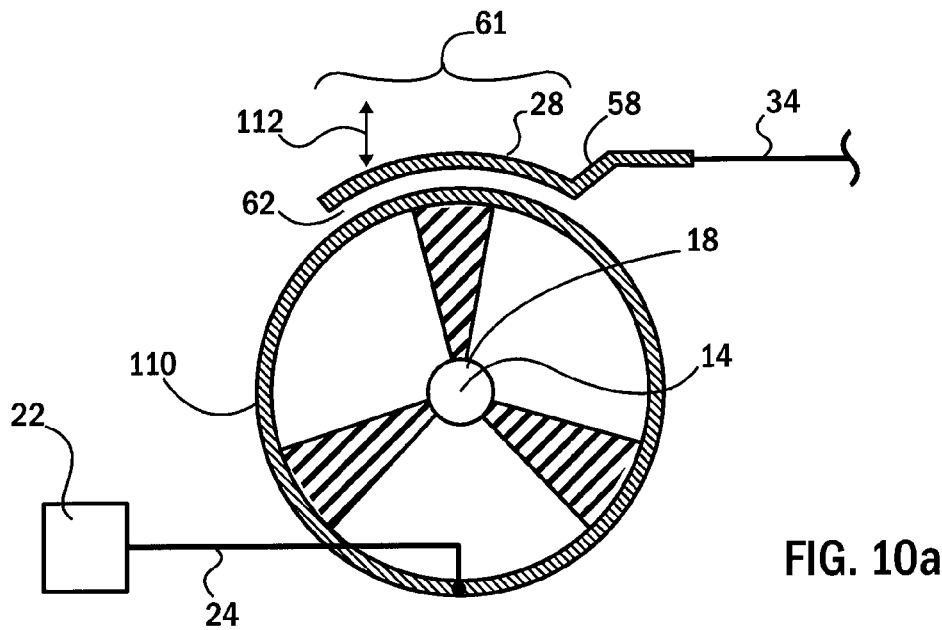
FIGS. 10a and 10b are figures showing alternative configuration of the capacitive coupling units operating on an outer cylindrical surface of rotor mounted capacitor plates.
Figure 10B:
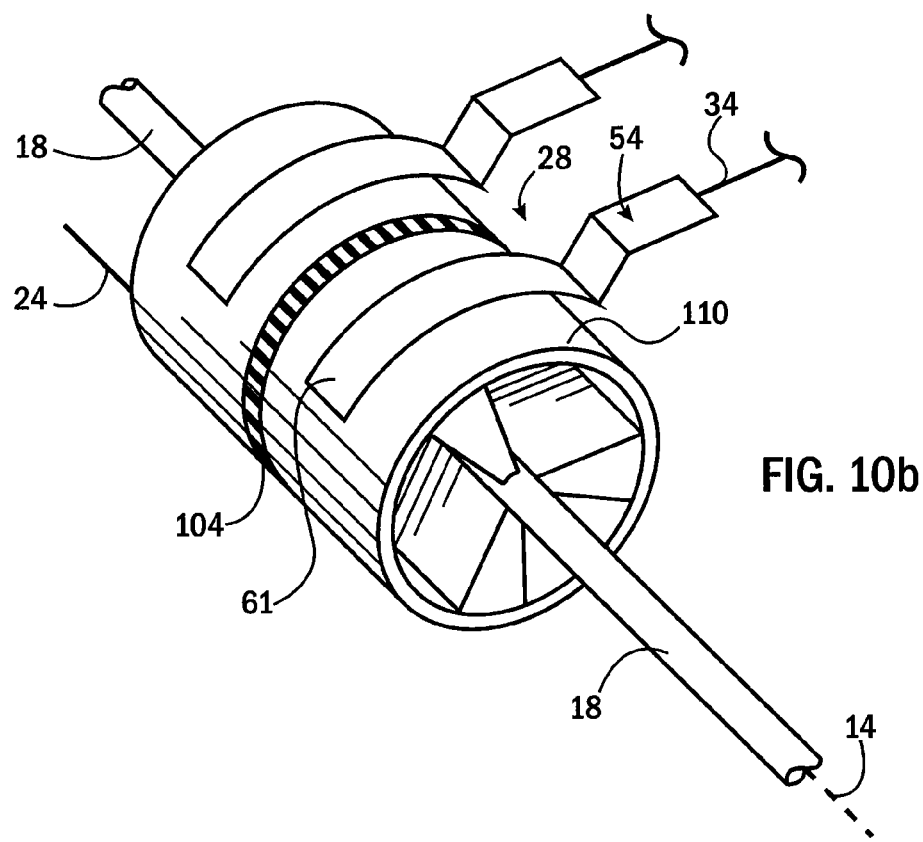

Referring now to FIGS. 10a and 10b, it will be appreciated that the geometry of the capacitive couplings may be implemented in a hoop form in which the function of the rotating plates 26a and 26b is implemented by an outer cylindrical surface of a cylindrical tube 110 attached concentrically to the shaft 18 where the plate portion 61 of the non-rotating plate 28 is given an arcuate form to conform generally with the outer periphery of the cylindrical tube 110 to move radially toward and away from axis 14 as indicated by arrow 112.

Figure 11:
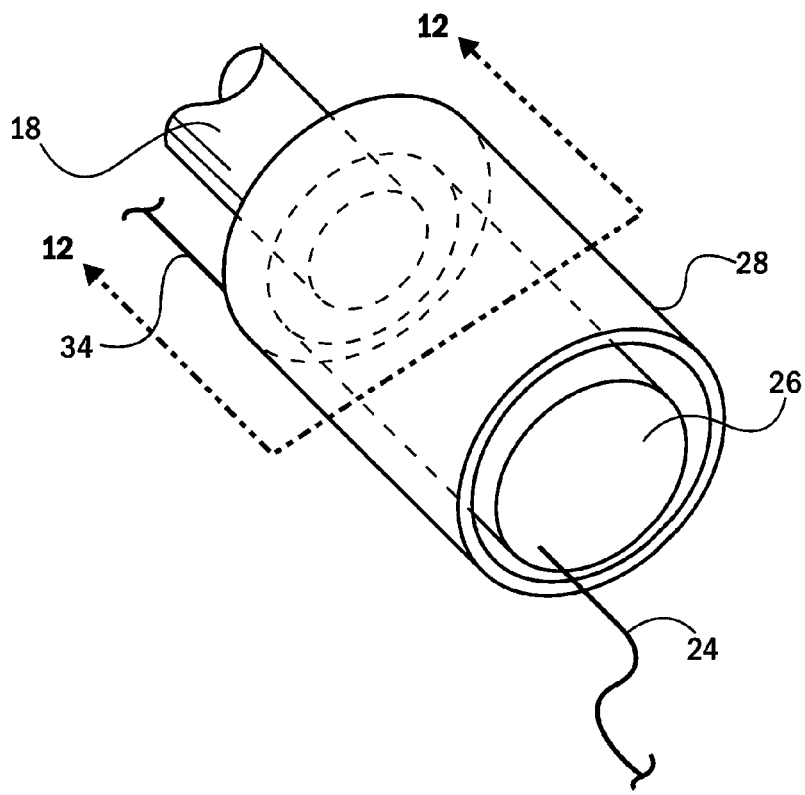
FIG. 11 is a fragmentary perspective view of an air bearing providing capacitive coupling units operating on an inner cylindrical surface of a frame mounted capacitor plate.
Figure 12:
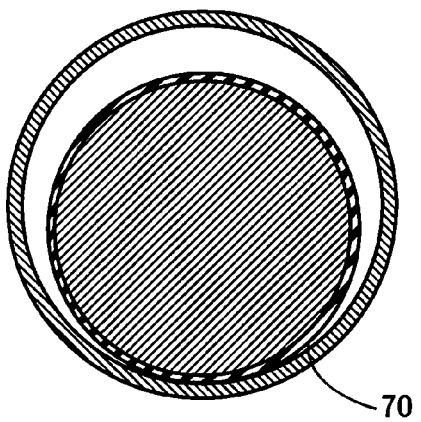
FIGS. 12 and 13 are cross-sectional figures taken along line 12-12 of FIG. 11 showing the capacitive coupling unit when the motor is at rest and during rotation.
Figure 13:
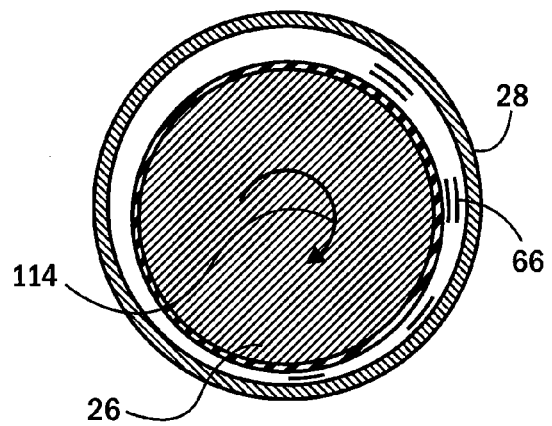

Referring now to FIGS. 11, 12 and 13, in an alternative embodiment, rotating plates 26a and 26b may be implemented as a cylindrical bearing element axially aligned with and attached to shaft 18. An outer circumferential surface of the cylindrical bearing element may in turn be surrounded by an inner cylindrical surface of a journal element providing non-rotating plates 28. The outer diameter of the rotating plates 26 may be close to the inner diameter of non-rotating plates 28 so that air 66 between the two provide for an air bearing action suspending the bearing element of the rotating plate 26 on a cushion of air 66 within the journal element of the non-rotating plate 28 during rotary motion 114 of the shaft 18. As before, a dielectric layer 70 may be applied to the outer surface of the rotating plates 26a and 26b (as shown) or the inner surface of the stator capacitive rotating plates 26 to accommodate contact between the two when there is no rotation.

Referring now to FIG. 12, it will be appreciated that the above-described principles may also be used with respect to a wound field synchronous machine 10 configured as generator 120 in which a magnetic field is established on a rotor coil 16 through a rectifier assembly 22 which receives an AC signal 34 through capacitive coupling units 25 from drive electronics 30. In this case, the stator windings 12 may be attached to drive a load 122.

It will further be appreciated that multiple pairs of non-rotating plates 28 and rotating plates 26 may be combined for each capacitive coupling unit 25 (in any of the configurations described herein) to gain the benefits of parallel addition of their capacitances. It will be further appreciated that the configuration of the non-rotating plates 28 may be exchanged with the configuration of the rotating plates 26, as it is their relative motion rather than their absolute motion which is of principal significance. It should be apparent that "capacitor plate" as used herein will be understood is not limited to planar plates but may be of any configuration in which a gap may be maintained with rotation of the corresponding plates of a capacitor.

Figure 15:
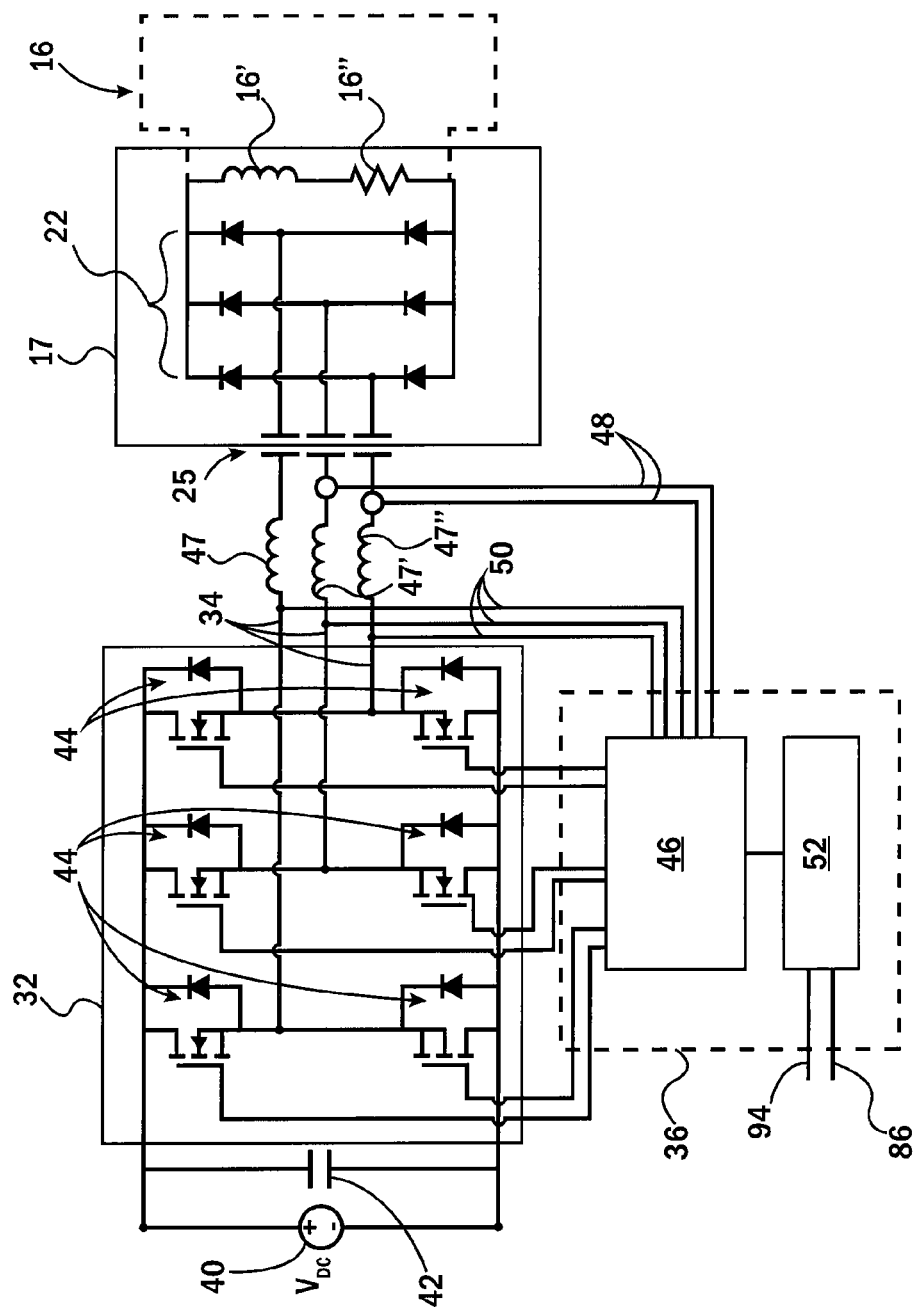
FIG. 15 a figure similar to FIG. 5 showing a multiphase version of the invention.

Referring now to FIG. 15, it will be appreciated that the principles of the present invention may be extended to multiphase motor/generator configurations. In this case, the frequency synthesizer may produce n-phase power where n is an integer (for example, three phase power as shown providing three approximations to sine waves each having relative phase shifts of 120 degrees with respect to the others). In this case of three-phase power, three inductors 47, 47', 47" may be placed in series with each of the three capacitive coupling units 25 (one associated with each phase) to provide the necessary resonant operation. The rectifier assembly 22 is likewise modified to handle three phase rectification. This approach provides reduced field current ripple and can be readily extended to any number of phases.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

Figure 14:
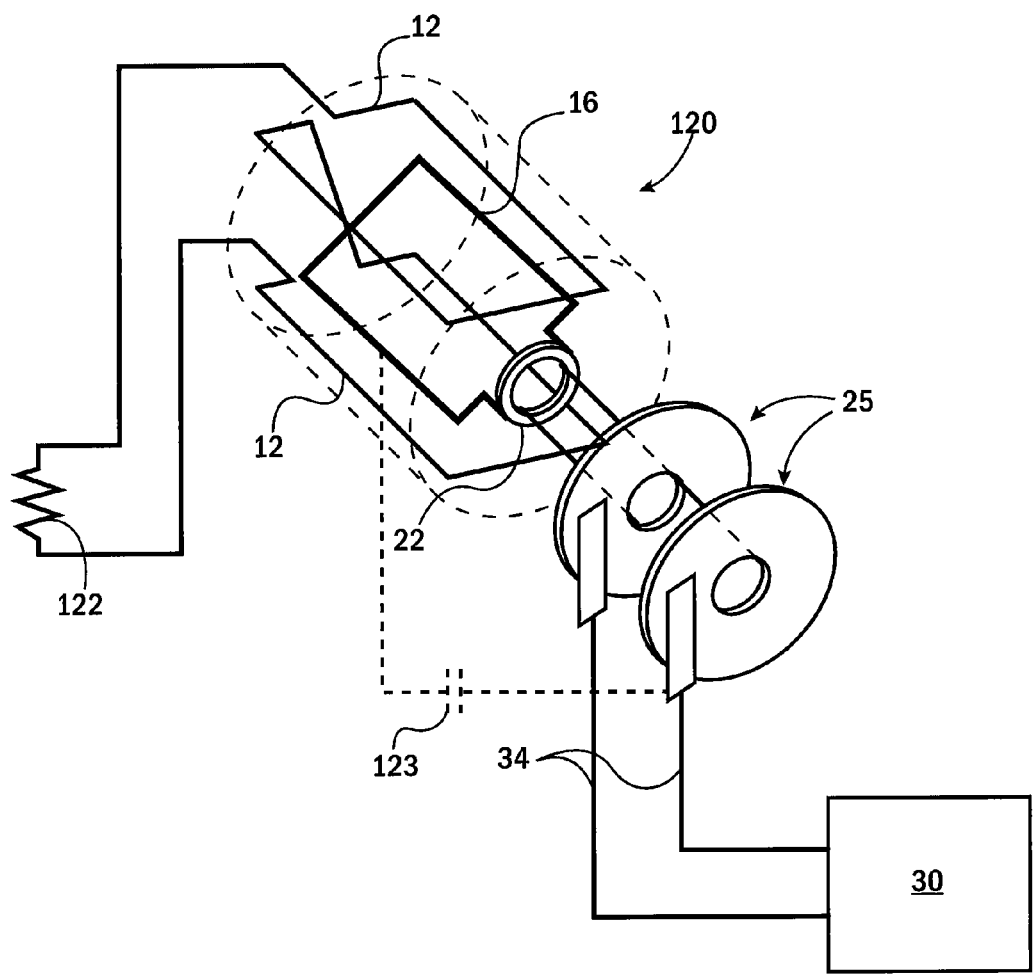
FIG. 14 is a figure similar to FIG. 1 showing a field-wound electrical generator according to of the present invention.

It will be appreciated from the above discussion that although separate capacitive coupling units 25 are described for providing power to and receiving power from the rotor 17, it may be possible to employ parasitic capacitances 123 (shown in FIG. 14) existing naturally between structures of the motor or generator (for example from the stator winding 12 to the housing 19) for one of these functions and thus to require as little as one capacitive coupling unit 25.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A wound field electrical rotating machine comprising:
a rotor mounted for rotation about an axis and including at least one electrical coil having a coil axis with a component perpendicular to the axis, the electrical coil comprising a conductor having first and second conductor ends;
an electrical rectifier unit attached to the rotor to rotate therewith and electrically communicating with the first and second conductor ends;
at least one first capacitor plate attached to rotate with the rotor and electrically communicating with the electrical rectifier unit;
at least one second capacitor plate mounted to a frame so as not to rotate with the rotor and positioned for capacitive coupling with the first capacitor plate;
wherein the first and second capacitor plates are positioned to transfer power to the electrical coil at a range of angular positions of the rotor about the axis.

2. The rotating machine of claim 1 further including a third capacitor plate attached to rotate with the rotor and electrically communicating with the electrical rectifier unit and a fourth capacitor plate mounted to a frame so as not to rotate with the rotor and positioned for capacitive coupling with a respective first and second capacitor plate wherein the third and fourth capacitor plates are positioned to return power from the electrical coil at a range of angular positions of the rotor about the axis.

3. The rotating machine of claim 2 wherein the first and third capacitor plates are separate plates attached to a rotor axle to extend in planes normal to the axis separated along the axis and wherein the second and fourth capacitor plates are interleaved between the first and second capacitor plates.

4. The rotating machine of claim 1 further including a power generation circuit substantially fixed with respect to the frame so as not to rotate with the rotor and communicating with the second and fourth capacitor plates to provide alternating current power to the at least one electrical coil having a frequency in excess of 50 kHz.

5. The rotating machine of claim 4 wherein the power generation circuit provides at least one watt of electrical power to the electrical coil.

6. The rotating machine of claim 4 wherein the power generation circuit provides for regulation of output current to the second and fourth capacitor plates to a predetermined value.

7. The rotating machine of claim 4 further including an inductance in series with at least one of the capacitor plates wherein the power generation circuit tracks a resonant frequency of a series resonant circuit, including at least the inductance, and a series combination of a capacitance formed between the first and second capacitive plate, and between the third and fourth capacitive plate, and wherein the power generation circuit adjusts the alternating current power to match a frequency of the resonant frequency.

8. The rotating machine of claim 7 wherein the power generation circuit adjusts the alternating current signal to match a frequency of the resonant frequency by changing a voltage polarity of the alternating current signal at the zero crossings of the current signal.

9. The rotating machine of claim 1 wherein for at least one given pair of the first and second capacitive plates, as a pair, and third and fourth capacitive plates, as a pair, a given plate of the given pair is movably mounted to change a spacing with the other plate of the given pair so that the given plate may float on an air cushion adjacent to the other plate of the given pair.

10. The rotating machine of claim 9 including a dielectric material attached to one of the given plates and the other plate of the given pair.

11. The rotating machine of claim 9 further including a spring biasing of the given plate toward the other plate of the given pair.

12. The rotating machine of claim 9 wherein the associated first, second, third, and fourth capacitive plates have pair wise configurations selected from the groups consisting of parallel planar plates and concentric cylindrical plates.

13. The rotating machine of claim 9 wherein the first and third capacitive plates, as a pair, and second and fourth capacitive plates, as a pair, define an air bearing journal and air bearing shaft.

14. The rotating machine of claim 9 further including a capacitance monitor measuring a capacitance between the given pair to provide an output signal indicating velocity of the rotor.

15. The rotating machine of claim 14 further including a field current control changing an electrical signal providing a magnetic field in the rotating machine as a function of the output signal indicating velocity of the rotor.

16. The rotating machine of claim 9 further including a capacitance monitor measuring a capacitance between the given pair to provide an output signal indicating a position of the rotor.

17. The rotating machine of claim 16 further including a field current control changing an electrical signal providing a magnetic field in the rotating machine as a function of the output signal indicating position of the rotor.

18. A method of operating a wound field electrical rotating machine having a rotor mounted for rotation about an axis and including at least one electrical coil having a coil axis with a component perpendicular to the axis, the electrical coil comprising a conductor having first and second conductor ends and further having an electrical rectifier unit attached to the rotor to rotate therewith and electrically communicating with the first and second conductor ends, and with a first and second capacitor plate attached to rotate with the rotor and electrically communicating with electrical rectifier unit and a third and fourth capacitor plate mounted to a frame so as not to rotate with the rotor and positioned for capacitive coupling with a respective first and second capacitor plate, the method comprising the step of:

applying an alternating voltage across the third and fourth capacitor plate to induce current flow in the electrical coil to cause continuous rotation of the rotor by capacitive coupling between the first and third and between the second and fourth capacitor plates over a range of angular positions of the rotor about the axis.

* * * * *